(12) United States Patent
Fennell

(10) Patent No.: US 11,584,463 B2
(45) Date of Patent: Feb. 21, 2023

(54) TRAILER

(71) Applicant: TOTAL TRAILER MANUFACTURERS PTY LTD, Welshpool (AU)

(72) Inventor: Brett Guy Fennell, Welshpool (AU)

(73) Assignee: TOTAL TRAILER MANUFACTURERS PTY LTD, Welshpool (AU)

( * ) Notice: Subject to any disclaimer, the term of this patent is extended or adjusted under 35 U.S.C. 154(b) by 473 days.

(21) Appl. No.: 16/759,649

(22) PCT Filed: Jun. 19, 2018

(86) PCT No.: PCT/AU2018/050603
§ 371 (c)(1),
(2) Date: Apr. 27, 2020

(87) PCT Pub. No.: WO2019/084594
PCT Pub. Date: May 9, 2019

(65) Prior Publication Data
US 2020/0290692 A1 Sep. 17, 2020

(30) Foreign Application Priority Data
Oct. 31, 2017 (AU) .............................. 2017904432

(51) Int. Cl.
*B62D 63/06* (2006.01)
*B60P 7/12* (2006.01)
(Continued)

(52) U.S. Cl.
CPC ............... *B62D 63/06* (2013.01); *B60P 7/12* (2013.01); *B62D 21/20* (2013.01); *B62D 53/061* (2013.01)

(58) Field of Classification Search
CPC .... A01D 90/083; B62D 63/06; B62D 53/061; B62D 21/20; B62D 33/0207; B60P 3/00
See application file for complete search history.

(56) References Cited

U.S. PATENT DOCUMENTS 3,291,073 A * 12/1966 James ................. B61D 45/008
410/49
4,365,919 A * 12/1982 Mehki ..................... B60P 3/035
410/47
(Continued)

FOREIGN PATENT DOCUMENTS

AU 2014200135 A1 1/2014
DE 102008011704 A1 9/2009
(Continued)

OTHER PUBLICATIONS

International Search Report and Written Opinion issued by the Australian International Searching Authority regarding International Application No. PCT/AU2018/050603, dated Jul. 27, 2018, 10 pages.
(Continued)

*Primary Examiner* — James A English
(74) *Attorney, Agent, or Firm* — Haynes and Boone, LLP

(57) ABSTRACT

The disclosure relates to a trailer for hauling tyres. The trailer includes a frame having a front end, a rear end and a pair of parallel elongate chassis rails. The trailer also includes one or more pairs of transverse rails, each pair of transverse rails being adapted to support one or more tyres in an upstanding position thereon. Each pair of transverse rails is longitudinally translatable with respect to the elongate chassis rails between the front and rear ends of the frame. Each transverse rail in the pair is independently longitudinally translatable with respect to the elongate chassis rails so that the spacing of the pair of transverse rails may be varied to suit a tyre diameter. The trailer is also provided
(Continued)

with a tyre stillage associated with each pair of transverse rails for supporting one or more upstanding tyres thereagainst.

22 Claims, 14 Drawing Sheets

(51) Int. Cl.
  *B62D 21/20* (2006.01)
  *B62D 53/06* (2006.01)

(56) References Cited

U.S. PATENT DOCUMENTS

| | | | | |
|---|---|---|---|---|
| 5,954,465 | A * | 9/1999 | Ellerbush | B60P 7/12 410/47 |
| 6,270,299 | B1 * | 8/2001 | Rehbein | B60P 7/10 410/35 |
| 6,923,608 | B2 * | 8/2005 | Rediehs | B61D 3/16 410/49 |
| 7,985,043 | B2 * | 7/2011 | Cook | B62D 63/06 414/331.14 |
| 8,434,778 | B2 * | 5/2013 | Ehrlich | B60P 7/12 280/423.1 |
| 2004/0234354 | A1 * | 11/2004 | Halliar | B60P 7/12 410/77 |
| 2009/0058041 | A1 * | 3/2009 | Fennell | B62D 33/0207 280/411.1 |
| 2010/0266370 | A1 * | 10/2010 | Munro | A01D 90/083 414/24.5 |

FOREIGN PATENT DOCUMENTS

| | | |
|---|---|---|
| EP | 1733955 B1 | 3/2008 |
| WO | WO-2014-008556 A1 | 1/2014 |

OTHER PUBLICATIONS

International Preliminary Report on Patentability issued by the Australian International Searching Authority regarding International Application No. PCT/AU2018/050603, dated Sep. 6, 2019, 16 pages.

* cited by examiner

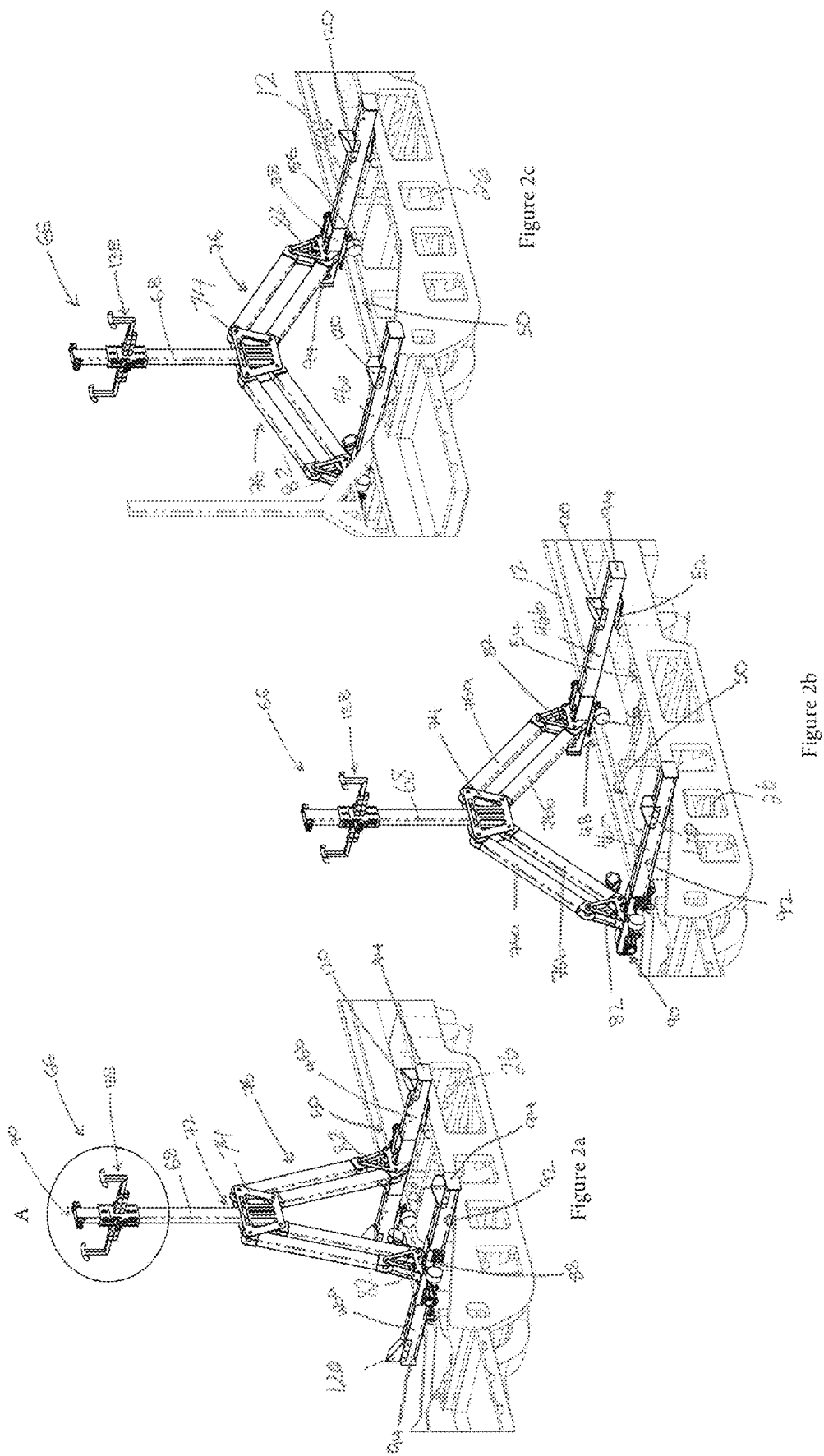

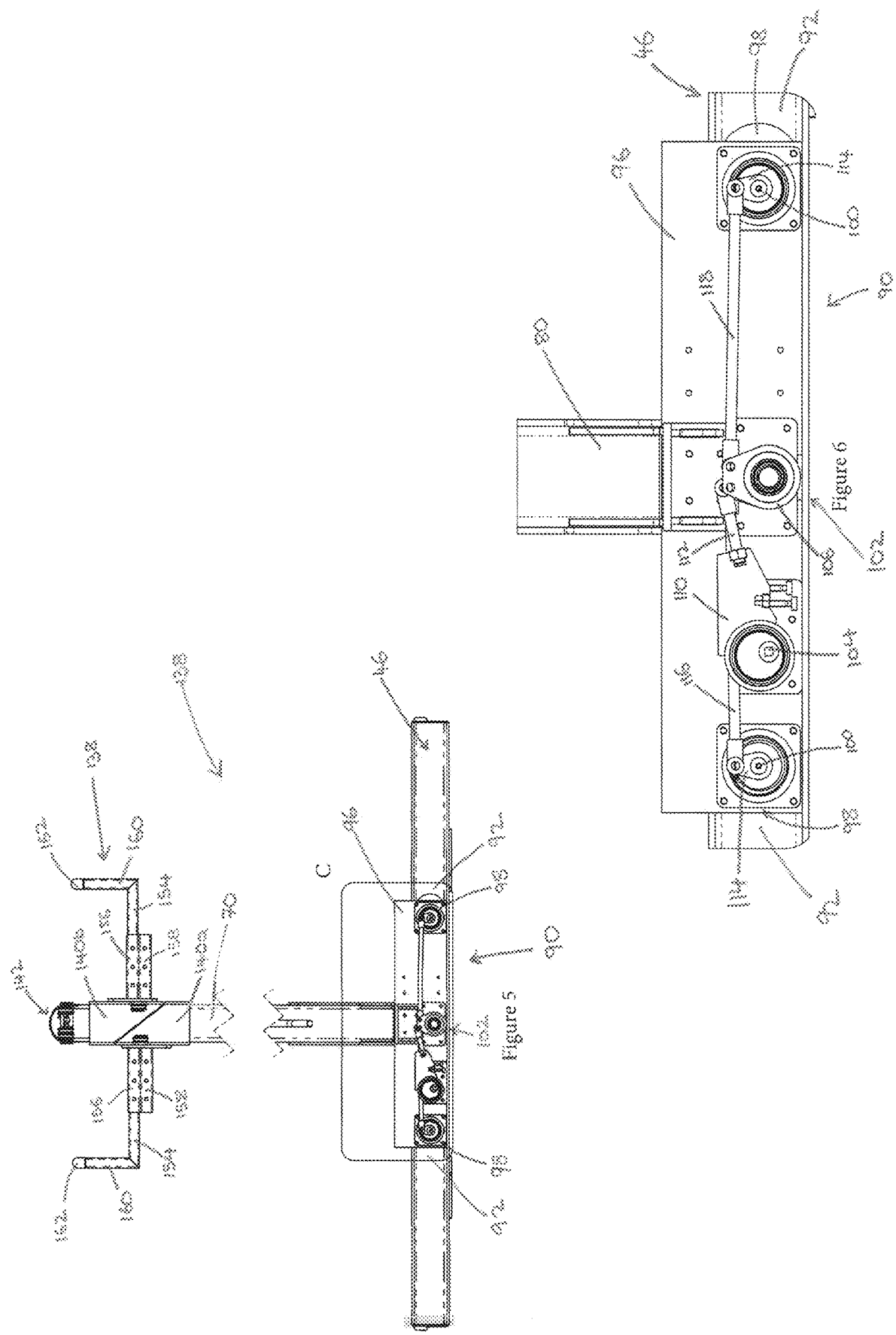

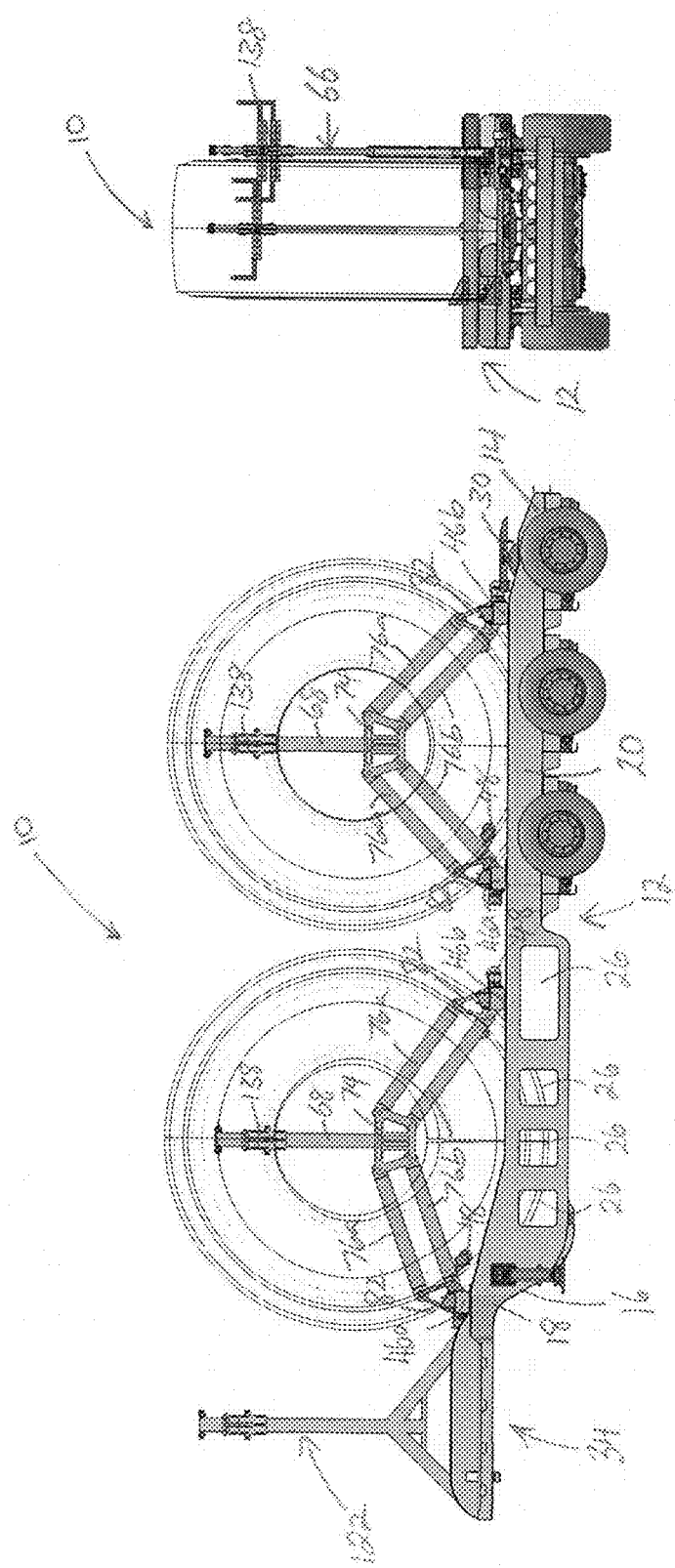

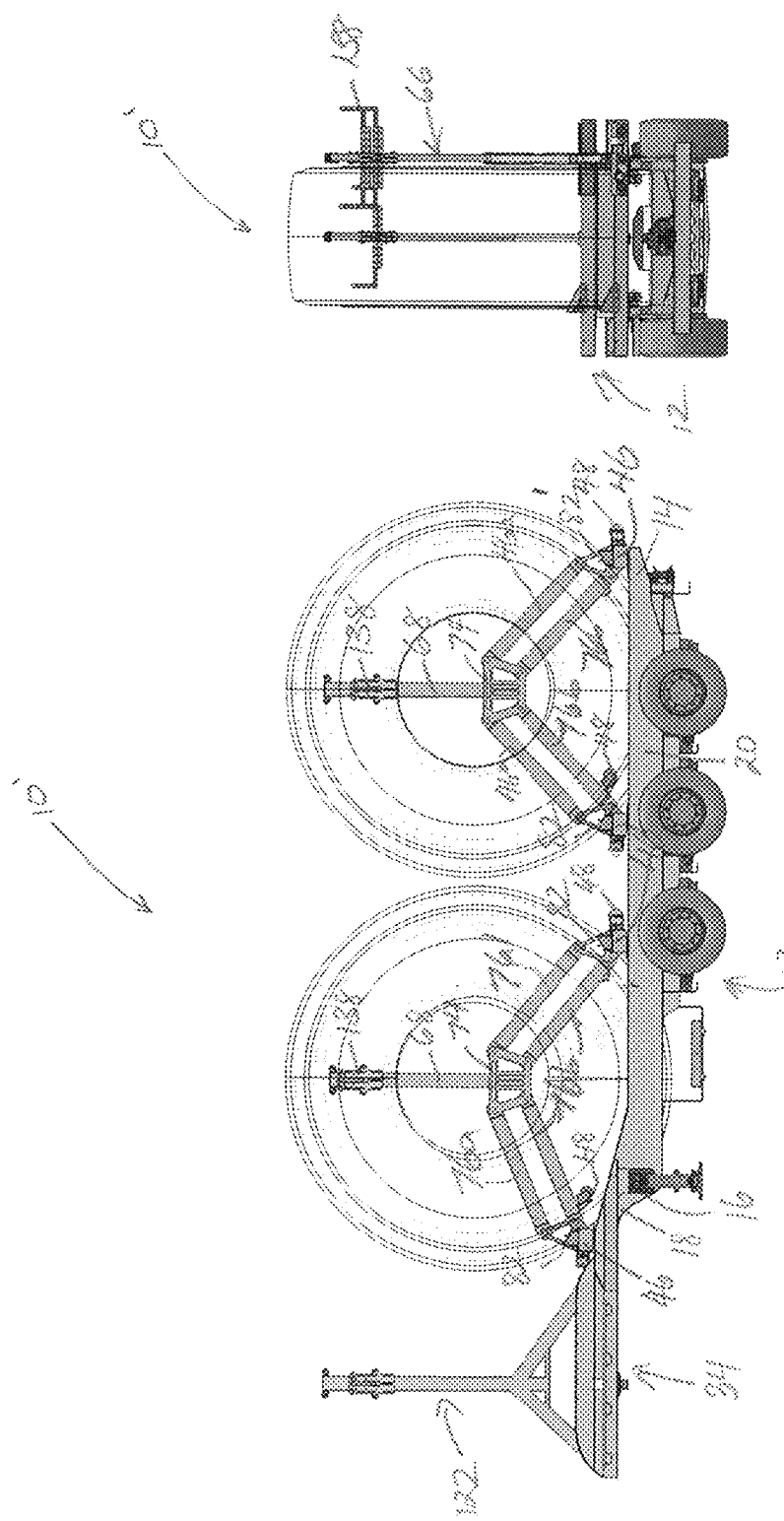

TRAILER

CROSS REFERENCE

This application is a United States national phase application of co-pending international patent application number PCT/AU2018/050603, filed Jun. 19, 2018, which claims priority to Australian patent application number 2017904432, filed Oct. 31, 2017, the entire disclosures of which are hereby incorporated herein by reference.

TECHNICAL FIELD

The present disclosure relates to a trailer for hauling tyres. In particular, the present disclosure relates to a trailer for hauling oversize tyres for use on heavy vehicles, such as construction and mining vehicles.

BACKGROUND

The following discussion of the background to the disclosure is intended to facilitate an understanding of the invention. However, it should be appreciated that the discussion is not an acknowledgement or admission that any of the material referred to was published, known or part of the common general knowledge as at the priority date of the application.

Transportation of large numbers of tyres is typically achieved by stacking several recumbent tyres on top of one another and securely tethering them to a platform of a flat bed truck or similar low platform trailer. This is particularly the case in instances where the overall diameter (OD) of the tyre is greater than the width of the haulage vehicle, and the haulage vehicle must consequently be accompanied by an escort, thereby leading to increased overall transportation costs.

Trailers for hauling tyres in an upstanding position have been previously developed with fixed stillages or stillages which can be translated between the sides of the trailer to accommodate tyres of different widths. However, it is often difficult and labour intensive to configure the trailers with different sized tyres, in particular outsize tyres, to maintain satisfactory weight distribution over the length of the trailer.

There is a need for further improvement in the loading and handling of tyres on trailers as well as a need to provide a trailer which can readily comply with weight restrictions, be adaptable to carry several types of different types and sizes of tyres in a configuration that will maintain the load balance across the trailer.

SUMMARY

The present disclosure provides a trailer for hauling tyres in an upstanding position.

Various embodiments of the disclosure provide a trailer comprising a frame having a front end, a rear end, and a pair of parallel elongate chassis rails; one or more pairs of transverse rails longitudinally translatable with respect to said elongate chassis rails between the front and rear ends, each pair of transverse rails being adapted to support one or more tyres in an upstanding position thereon; and a tyre stillage associated with each pair of transverse rails for supporting one or more upstanding tyres thereagainst, wherein the tyre stillage is transversely translatable with respect to the transverse rails.

In one embodiment, each transverse rail in the one or more pairs of transverse rails may be independently translatable with respect to said elongate chassis rails.

In one form, the transverse rails may be provided with a first roller assembly configured to engage the elongate chassis rail, wherein the first roller assemblies may be configured to releasably fasten the transverse rails to the elongate chassis rails at a desired position.

In one embodiment, the tyre stillage comprises a vertical elongate member having an upper portion and a lower portion, an upper hinge member coupled to the lower portion of the vertical elongate member, and a pair of lower elongate members, wherein a respective upper end of each lower elongate member is hingedly coupled to the upper hinge member and a respective lower end of each lower elongate member is configured to be translatable with respect to the transverse rails.

In one embodiment, the lower end of each lower elongate member is provided with a lower hinge member to allow each transverse rail to be independently translatable with respect to said elongate chassis rails. The lower hinge member may also be provided with a second roller assembly configured to engage the transverse rails and allow the stillage to be translatable with respect to said transverse rails.

The second roller assemblies are configured to releasably fasten the tyre stillage to the transverse rail at a desired position.

In one embodiment, the lower elongate member comprises a pair of parallel elongate members.

In another embodiment, each transverse rail is provided with at least one chock to support the upstanding tyre against the tyre stillage. The chock may be slidable to a desired position along the transverse rail. In some particular embodiments, the chock may be configured to be fastened at the desired position along the transverse rail to support the upstanding tyre.

In one embodiment, the frame comprises a plurality of transverse cross-members interconnecting the parallel elongate chassis rails.

In one embodiment, the front end of the frame is elevated with respect to the rear end of the frame to facilitate coupling of the frame to a tractor unit. For example, the front end may be elevated to facilitate the coupling of the frame to a tractor unit or an adjacent trailer. In this embodiment, a tyre support frame may extend from the front end of the frame.

The tyre support frame comprises a front transverse rail and a rear transverse rail spaced apart at a distance to support the lower circumferential surface of one or more tyres in the upstanding position thereon, and a pair of side rims interconnecting the front and rear transverse rails. Additionally, the tyre support frame may further comprise a rigid tyre stillage mounted on and between the pair of transverse rails for supporting one or more upstanding tyres thereagainst.

In one embodiment, the rigid tyre stillage comprises a vertical elongate member supported by a base member, wherein the base member is disposed in spaced parallel alignment between the side rims interconnecting the front and rear transverse rails.

In one embodiment, the tyre stillage or the rigid tyre stillage comprises a restrainer configured to engage the one or more upstanding tyres and restrain lateral movement of the one or more upstanding tyres relative to said tyre stillage. In this form, the restrainer comprises a sleeve member for engaging said tyre stillage, a bracket member transversely extending from the sleeve member, and a hook member extending from the bracket member for engaging the upstanding tyre. Additionally, the restrainer may further comprise a pulley assembly to raise or lower the sleeve member of the restrainer to a desired position with respect to said tyre stillage.

The present disclosure also provides a long combination vehicle for hauling tyres comprising two or more trailers according to any one of the previous claims coupled in longitudinal alignment with one another and a tractor unit.

BRIEF DESCRIPTION OF DRAWINGS

Embodiments of the disclosure will be described and illustrated, by way of example only, with reference to the accompanying figures in which:

FIGS. 2a, 2b and 2c illustrate a perspective view of a tyre stillage associated with a pair of transverse rails in a first, second and third position, respectively;

FIG. 5 illustrates a side view of the tyre stillage shown in FIGS. 1 to 3;

FIG. 6 illustrates a detailed view of C as shown in FIG. 5;

FIG. 8a illustrates a side view of the trailer shown in FIG. 1 loaded with two oversize tyres;

FIG. 8b illustrates a rear view of the trailer shown in FIG. 8a;

FIG. 9b illustrates a rear view of the trailer shown in FIG. 9a;

FIG. 11a illustrates a side view of the trailer shown in FIG. 10 loaded with two oversize tyres;

FIG. 11b illustrates a rear view for the trailer shown in FIG. 11a;

FIG. 12b illustrates a rear view of the trailer shown in FIG. 12a;

FIG. 14a illustrates a side view of the trailer shown in FIG. 13 loaded with two oversize tyres;

FIG. 14b illustrates a rear view for the trailer shown in FIG. 14a;

FIG. 15b illustrates a rear view of the trailer shown in FIG. 15a;

DESCRIPTION OF EMBODIMENTS

Figure 1:
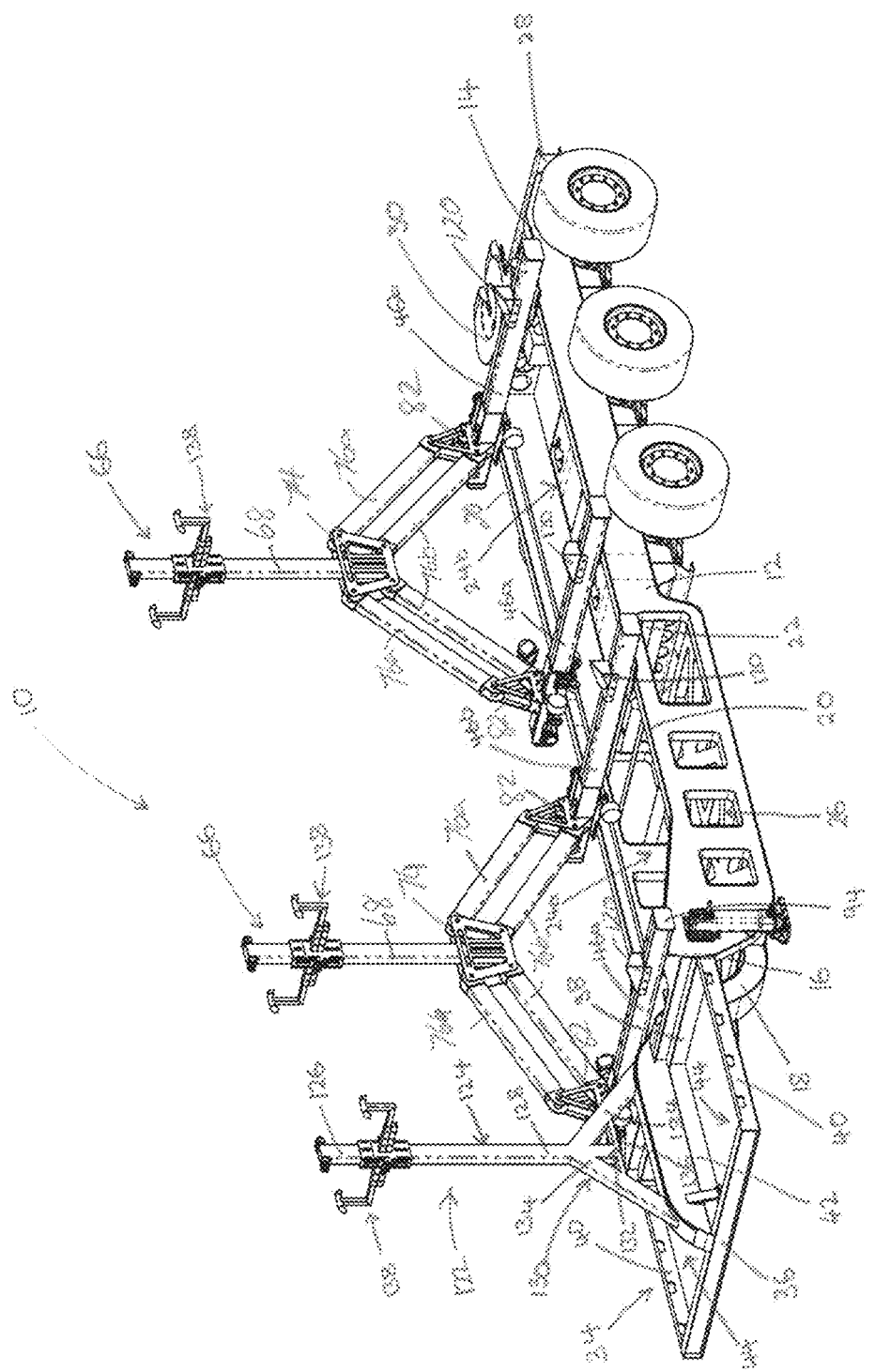
FIG. 1 illustrates a perspective view of one embodiment of a trailer in accordance with the present disclosure.
Figure 4:
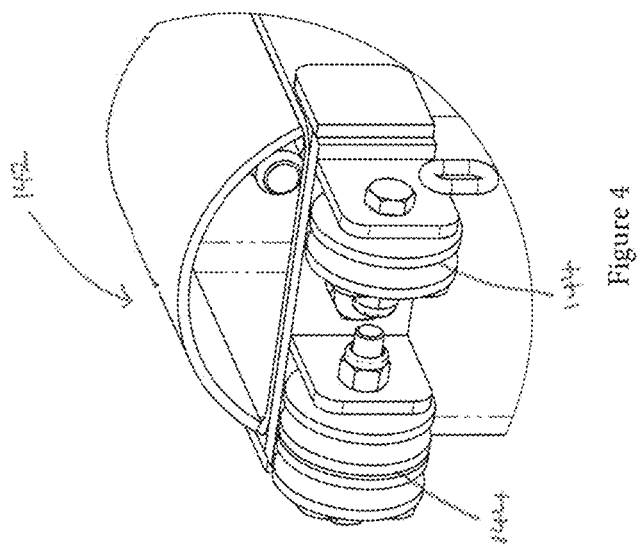
FIG. 4 illustrates a detailed view of B as shown in FIG. 3.
Figure 3:
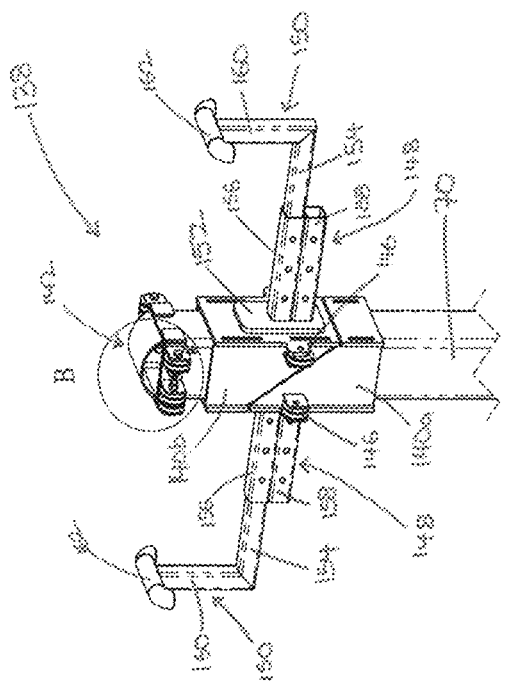
FIG. 3 illustrates a detailed view of A as shown in FIG. 2A.
Figure 7:
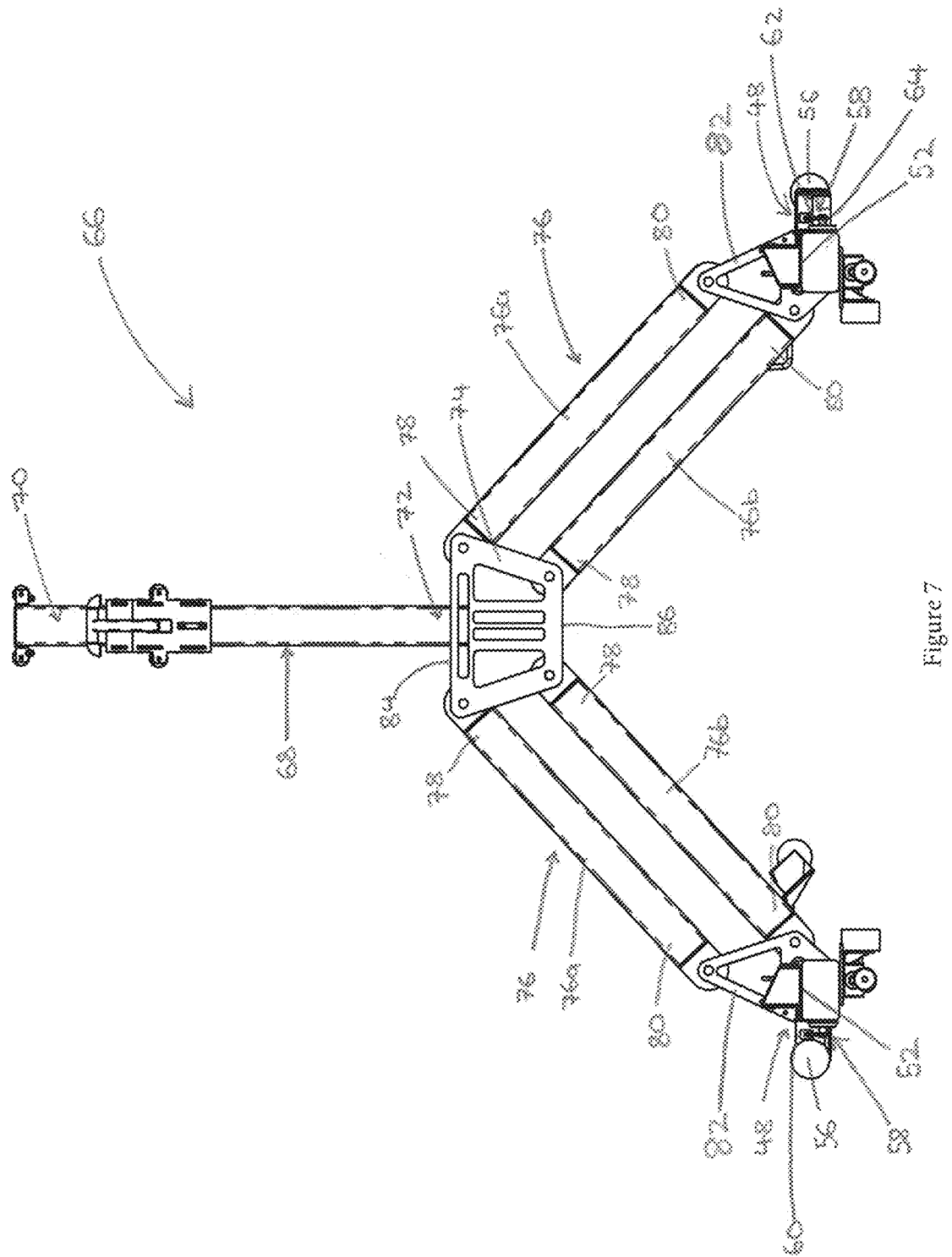
FIG. 7 is a detailed view of the tyre stillage as shown in the preceding Figures.
Figure 9B:
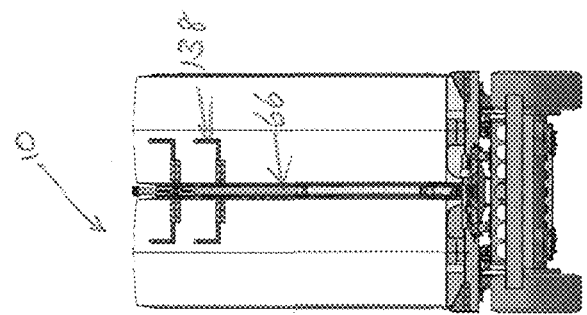
Figure 9A:
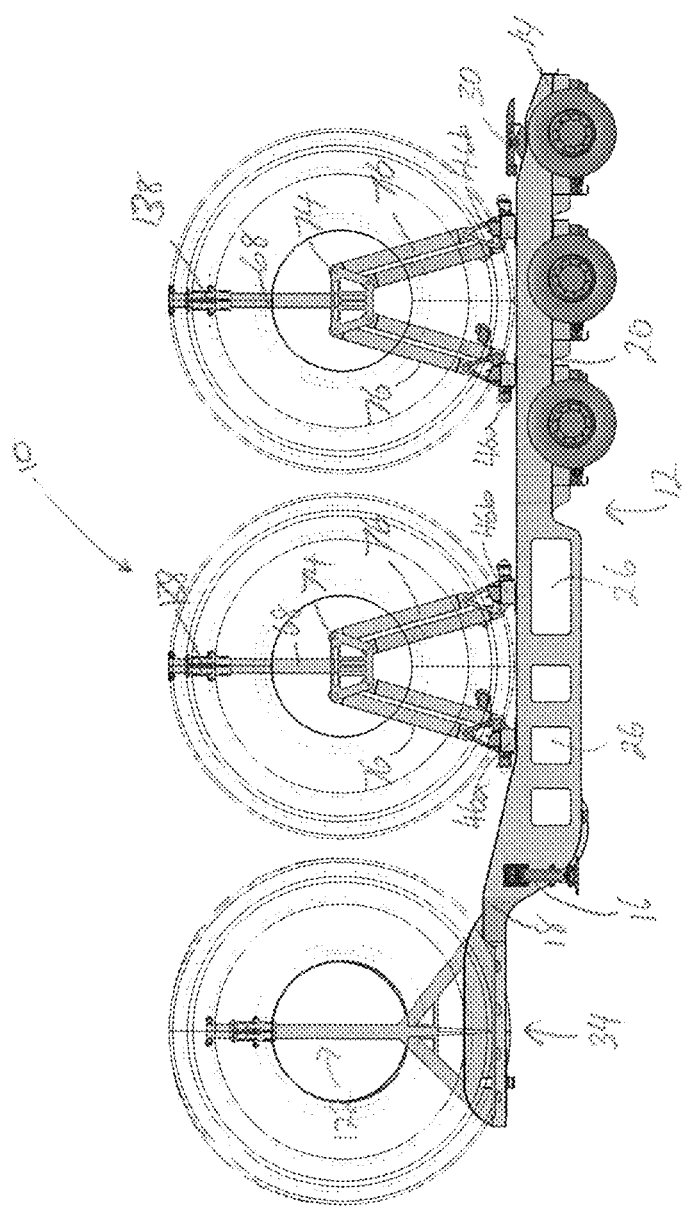
FIG. 9a illustrates a side view of the trailer shown in FIG. 1 loaded with six tyres.
Figure 10:
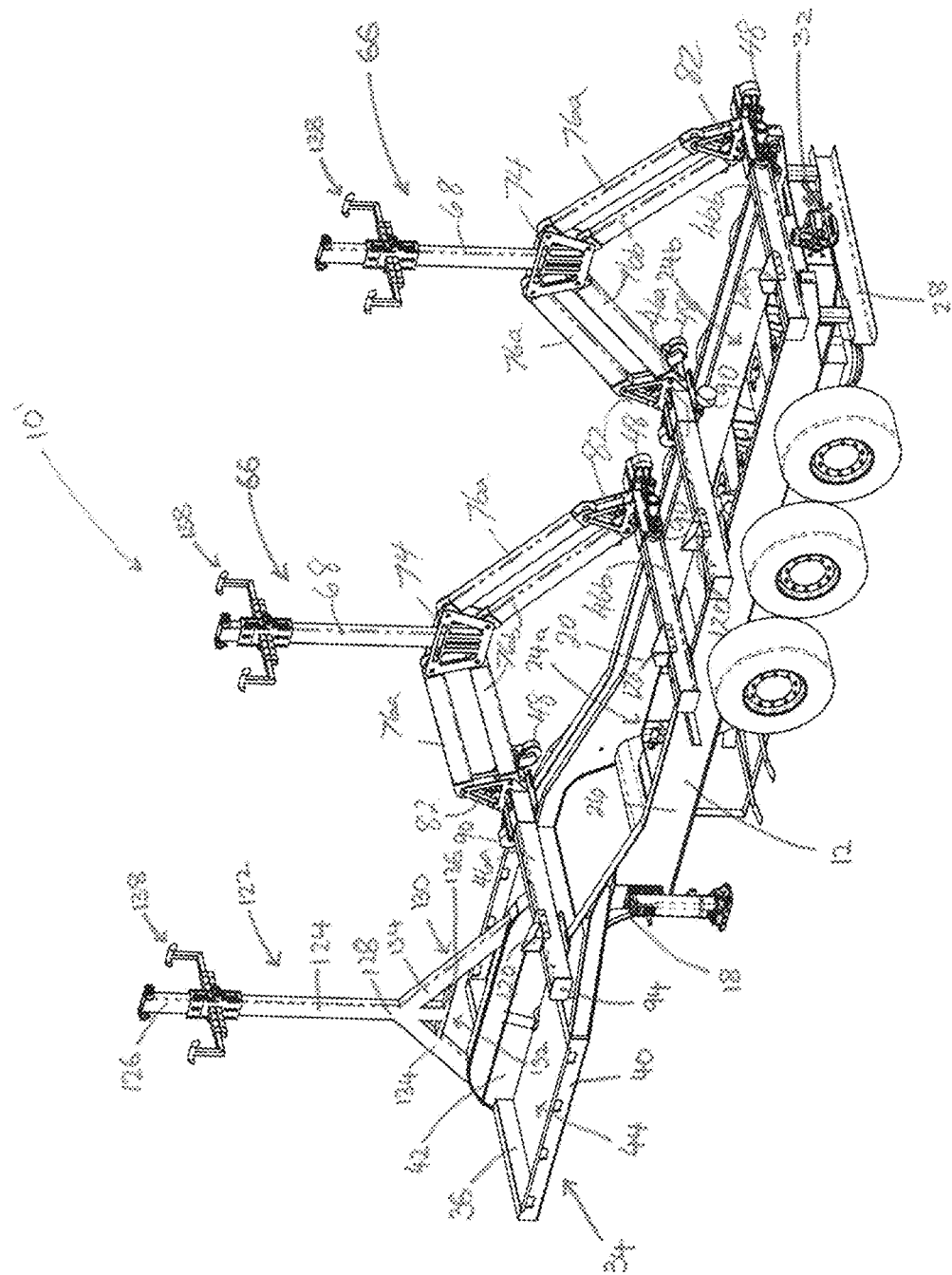
FIG. 10 illustrates a perspective view of an alternative embodiment of the trailer in accordance with the present disclosure.
Figure 12B:
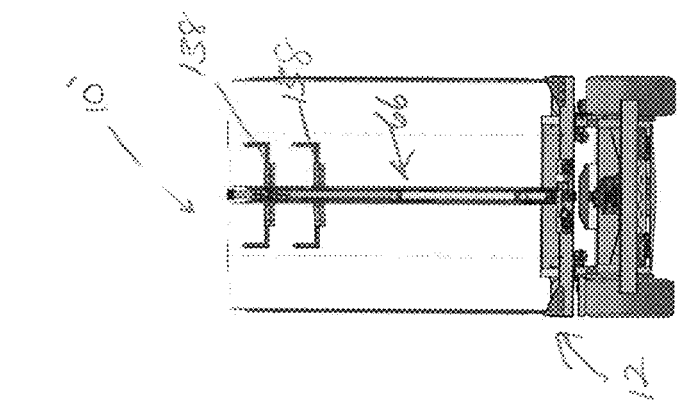
Figure 12A:
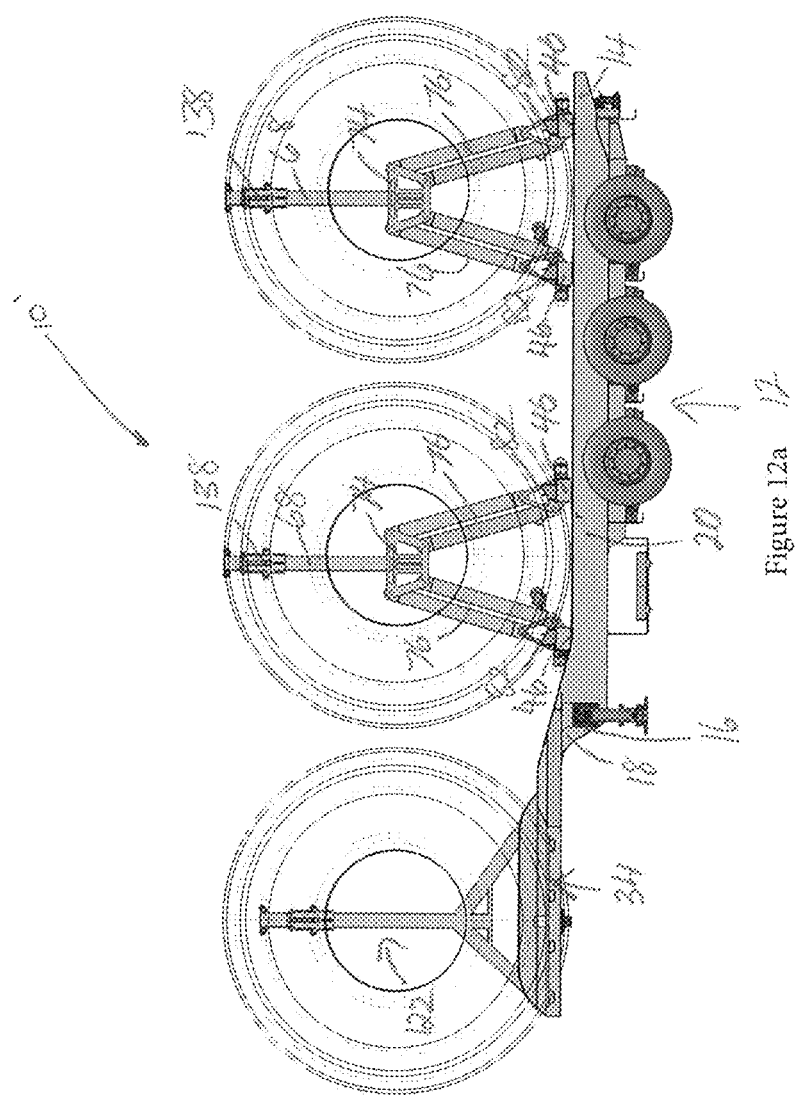
FIG. 12a illustrates a side view of the trailer shown in FIG. 10 loaded with six tyres.
Figure 13:
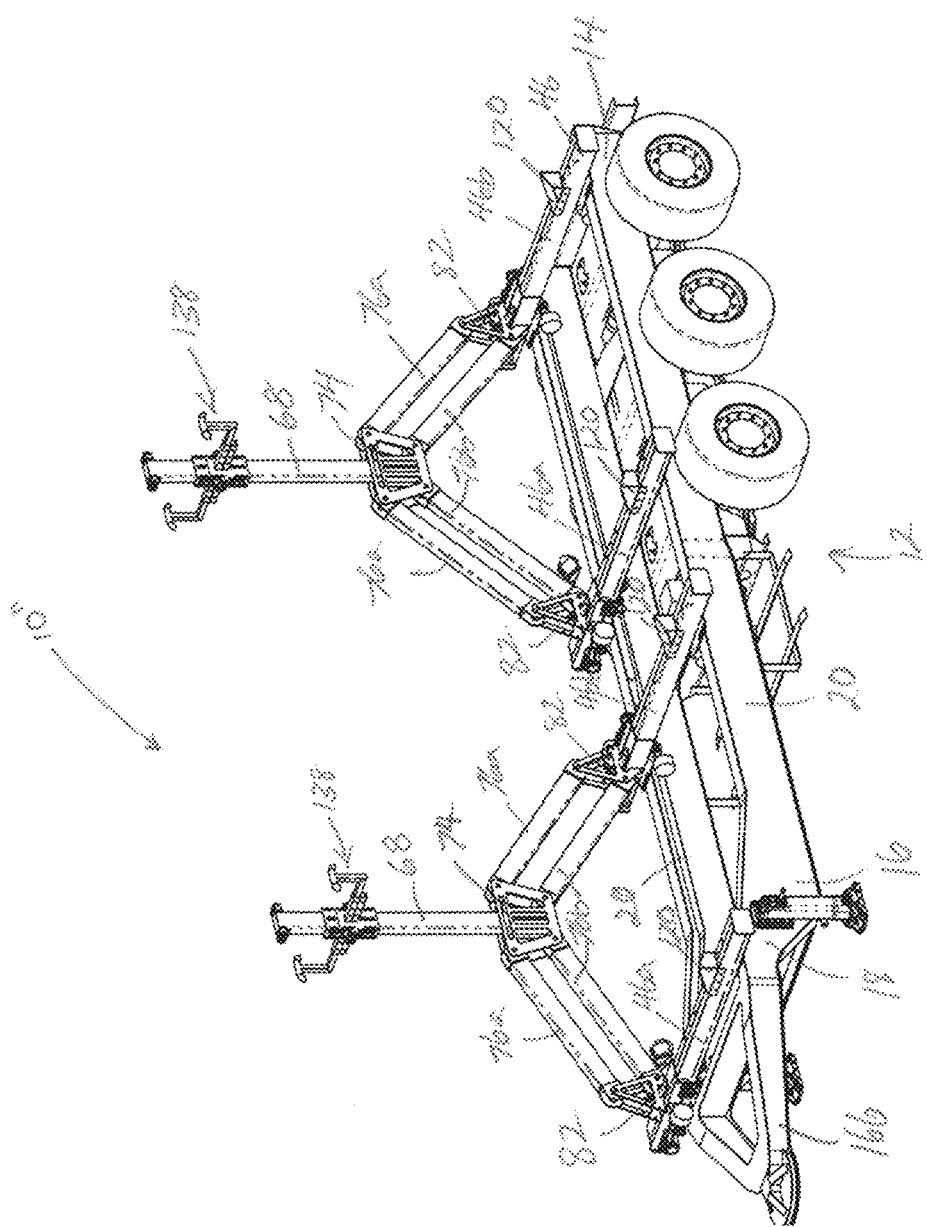
FIG. 13 illustrates a perspective view of a further embodiment of the trailer in accordance with the present disclosure.
Figures 14A, 14B:
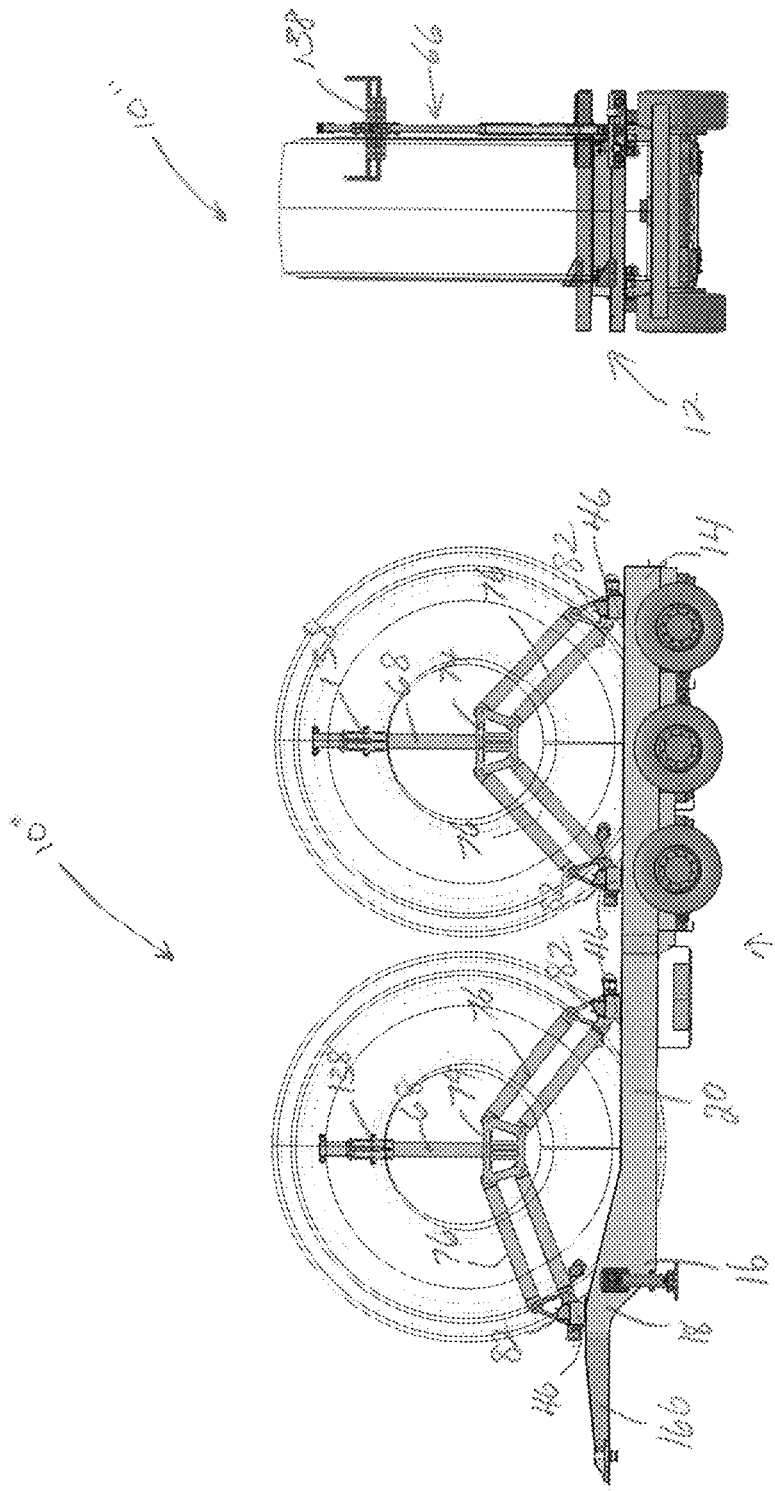
Figure 15B:
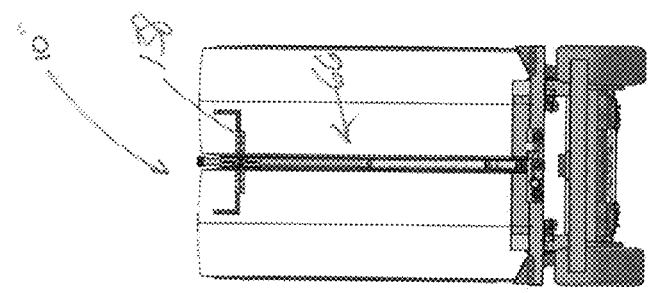
Figure 15A:
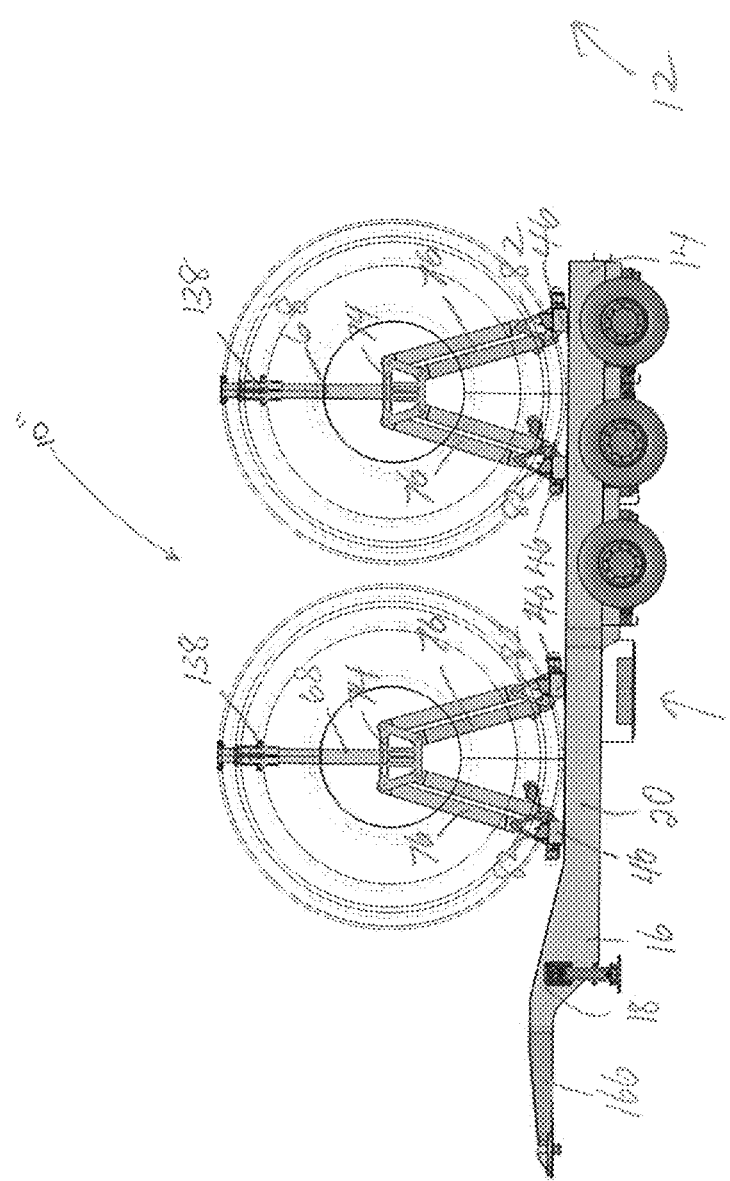
FIG. 15a illustrates a side view of the trailer shown in FIG. 13 loaded with four tyres.

The present disclosure relates to a trailer for hauling tyres in an upstanding position in the following various non-limiting embodiments.

General Terms

Throughout this specification, unless specifically stated otherwise or the context requires otherwise, reference to a single step, composition of matter, group of steps or group of compositions of matter shall be taken to encompass one and a plurality (i.e. one or more of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purposes of exemplification only. Functionally-equivalent products, compositions and methods are clearly within the scope of the disclosure as described herein.

The term "and/or" e.g., "X and/or Y" shall be understood to mean either "X and Y" or "X or Y" and shall be taken to provide explicit support for both meanings or for either meaning.

Throughout this specification the word "comprise", or such variations such as "comprises" or "comprising", will be understood to imply the inclusion of a stated element, integer or step, or group of elements, integers or steps, but not the exclusion of any other element, integer or step, or group of elements, integers or steps.

It will be clearly understood that, although a number of prior art publications are referred to herein, this reference does not constitute an admission that any of these documents forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, and examples are illustrative only and do not intend to be limiting.

Specific Terms

The term 'upstanding' as used herein with reference to a tyre refers to said tyre being positioned on its rim (or tread) or supported on its circumferential surface.

The term 'oversize' as used herein with respect to tyres may be used interchangeably with 'out of gauge' and refers to a tyre, which when hauled as a load has a dimension (i.e. width or diameter) that does not comply with road transport regulations. Generally, an oversize tyre is one whose width or diameter exceeds 2.5 m.

Trailer

Referring to the Figures, where like numerals refer to like features throughout, a trailer for hauling tyres 10, 10', 10", in particular for hauling tyres with an overall diameter (OD) of about 1000 mm to about 4100 mm, is shown.

Figure 16:
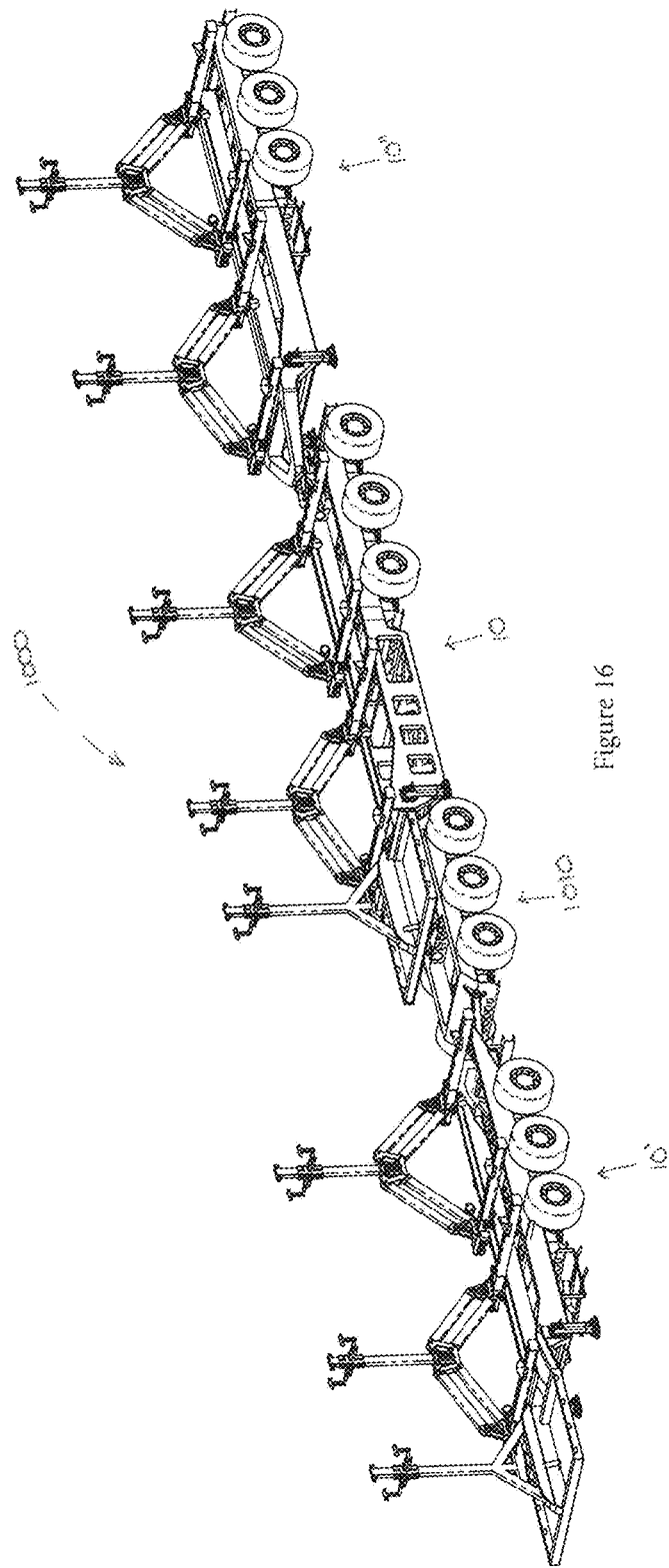
FIG. 16 illustrates a perspective view of a long combination vehicle comprising a plurality of the trailers shown in FIGS. 1, 10 and 13 coupled in longitudinal alignment with one another.
Figure 17:
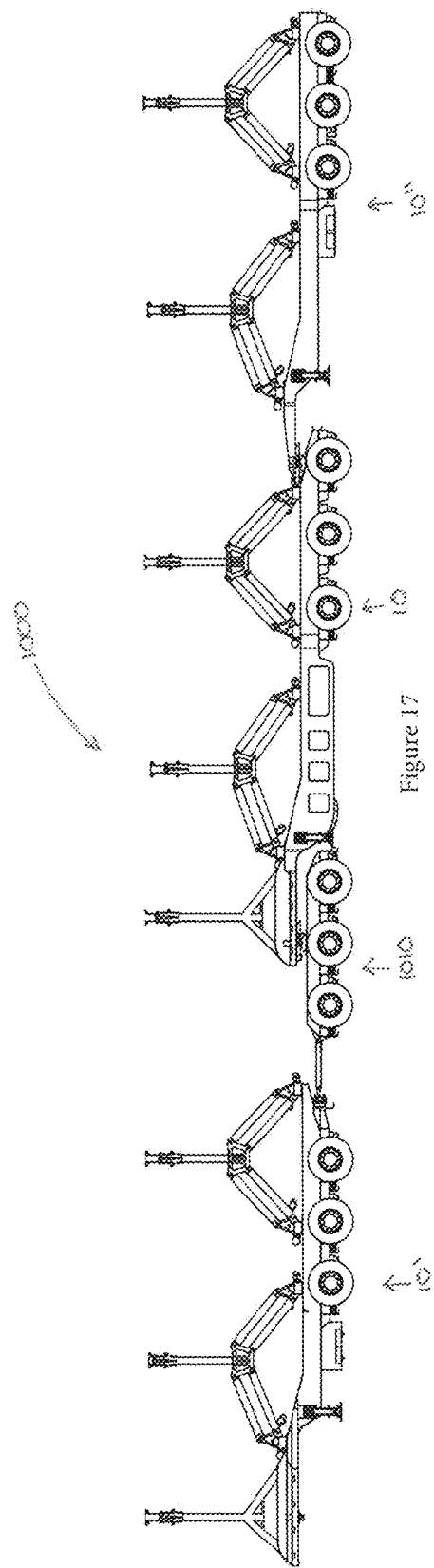
FIG. 17 illustrates a side view of the long combination vehicle shown in FIG. 16.

The trailers 10, 10', 10" include a frame 12 having a rear end 14 extending over the axles of the trailer 10, 10', 10"and a front end 16 extending generally forwardly of the axles of the trailer 10, 10', 10". The front end 16 may be elevated with respect to the rear end 14 of the frame 12 to facilitate coupling of the trailer 10, 10', 10" to a tractor unit or an adjacent trailer 10, 10' to produce a long combination vehicle 1000 as shown in FIGS. 16 and 17. In the embodiments shown in the figures, the front end 16 is stepped up relative to the rear end 14 of the frame 12 via a goose neck portion 18.

The frame 12 includes a pair of parallel elongate chassis rails 20 and a plurality transverse cross-members 22 interconnecting the elongate chassis rails 20 at intervals along the length of the elongate chassis rails 20 to provide strength and rigidity to the frame 12, thereby preventing the frame 12 from twisting under load.

The spacing of the transverse cross-members 22 along the length of the elongate chassis rails 20 is also selected to define a front space 24a and a rear space 24b between the elongate chassis rails 20 in which to store spare tyres for the trailers 10, 10', 10". In the front end 16 of the frame 12, the elongate chassis rails 20 may have an increased depth and be provided with apertures 26 therein. The apertures 26 serve not only as lightening holes to reduce the weight of the frame 12 but are configured to receive spare tyres for the trailers 10, 10', 10" in the front and rear spaces 24a, 24b defined between the elongate chassis rails 20 and the transverse cross-members 22.

It will be appreciated that an undercarriage of the trailer 10, 10', 10", in other words an underside of the frame 12, is generally conventional in design and includes a plurality of wheel assemblies, supporting jacks, and suitable coupling assemblies for attachment for a haulage vehicle, such as a semi-trailer tractor unit, and so forth.

The rear end 14 may optionally be provided with a bumper bar 28.

The rear end 14 of the trailer 10, 10', 10" may be provided with a fixed turntable 30, configured to couple with an adjacent trailer 10, 10', 10" in longitudinal alignment therewith to produce the long combination vehicle 1000 as shown in FIGS. 16 and 17.

In an alternative arrangement, the rear end 14 of the trailer 10, 10', 10" may be provided with a coupling device 32, such as a tow hitch, adapted to couple the detachable dolly 1010 thereto, the detachable dolly 1010 being arranged to couple the adjacent trailer 10, 10', 10" in longitudinal alignment therewith. Suitable examples of coupling devices 32 include, but are not limited to, a turntable, such as for example a ballraise or fixed turntable or a tow hitch. It is convenient for the coupling device 32 to be disposed on the rear end 14 so that the front end 16 of the adjacent trailer 10, 10', 10" may be coupled therewith.

The front end 16 may include a tyre support frame 34 extending forwardly from the goose neck portion 18. The tyre support frame 34 includes a front transverse rail 36, a rear transverse rail 38 and a pair of side rims 40 interconnecting the front and rear transverse rails 36, 38. The tyre support frame 34 may further include a longitudinal cross-member 42 interconnecting the front and rear transverse rails 36, 38 and spaced between side rims 40, thereby defining two adjacent spaces 44 within tyre support frame 34. The longitudinal cross-member 42 also increases the rigidity of the tyre support frame 34.

In use, the two adjacent spaces 44 may be occupied by two adjacent upstanding tyres whose circumferential surface is supported by the front and rear transverse rails 36, 38 of the tyre support frame 34.

The trailer 10, 10', 10" also includes one or more pairs of transverse rails 46 mounted on the elongate chassis rails 20 between the rear and front ends 14, 16 of the frame 12. In FIGS. 1 and 8a to 15b with reference to trailers 10, 10', 10", two pairs of transverse rails 46 are shown mounted on the elongate chassis rails 20. One of the two pairs of transverse rails 46 is mounted proximal to the rear end 14 of the frame 12 and the other pair of transverse rails 46 is mounted proximal to the front end 16 of the frame 12.

It will be appreciated that other embodiments of the trailer 10 may include more than two pairs of translatable transverse rails 46 mounted on the frame 12 between the rear and front ends 14, 16.

Each pair of transverse rails 46 comprises a front rail 46a and a rear rail 46b, and may comprise one or more apertures therealong said front and rear rails 46a, 46b. The front and rear rails 46a, 46b may be spaced apart, in use, to support a lower circumferential surface of one or more tyres in an upstanding position, as shown in the Figures. In other words, the rims of the one or more tyres rest on the front and rear rails 46a, 46b.

Each transverse rail 46a, 46b is provided with a pair of first roller assemblies 48 operatively engaged with respect to the elongate chassis rails 20 to facilitate longitudinal translation of the transverse rails 46a, 46b independently of one another between the rear and front ends 14, 16 of the frame 12. In this particular embodiment, the elongate chassis rails 20 are respectively configured with a first C-section profile 50 to facilitate travel of the first roller assemblies 48 along their length.

The first roller assembly 48 comprises a wear plate 52, which is configured to engage an upper surface 54 of the elongate chassis rail 20 when mounted thereon and a respective first roller 56, as shown in FIGS. 2a to 2c and FIG. 5. The first roller 56 may be configured to engage with and travel along the first C-section profile 50 of the elongate chassis rail 20, and be releasably fastened to a desired position therealong by means of suitable fixing means.

The wear plate 52 and the first roller 56 may be 'locked' in a friction fit in a desired position along the first C-section profile 50 of the elongate chassis rail 20, by a first rocker assembly 58. The first rocker assembly may be actuated by a first lever 60, preferably by a first over-centre lever 62, positionable between a locked position and an unlocked position. In a locked position, the first roller 56 is raised upwardly to abut an upper surface of the first C-section profile 50 of the elongate chassis rail 20. To ensure that the first roller 56 remain locked in the desired position along the first C-section profile 50 of the elongate chassis rail 20, bolts may be threaded through aligned boltholes in the wear plate 52 and correspondingly aligned apertures in the first C-section profile 50. In an unlocked position, the first roller 56 engages a lower surface of the first C-section profile 50 of the elongate chassis rail 20 allowing it to roll along the first C-section profile 50 and translate the respective transverse rail 46a, 46b to the desired position along the elongate chassis rail 20.

As shown in FIGS. 2a-2c, the transverse rails 46a, 46b may be independently positioned along the length of the elongate chassis rails 20 so that the spacing between the transverse rails 46a, 46b may be adjusted to allow for the lower circumferential surface of one or more tyres of different diameters to be supported thereon. Additionally and advantageously, the transverse rails 46a, 46b may be positioned along the length of the elongate chassis rails to a desired position which facilitates improved load distribution over the trailer 10, 10', 10"

Each pair of translatable transverse rails 46a, 46b is provided with a respective tyre stillage 66 associated therewith for supporting one or more upstanding tyres thereagainst. The tyre stillage 66 is configured to be translatable along the front and rear rails 46a, 46b.

The tyre stillage 66 includes a first vertical elongate member 68 having an upper portion 70 and a lower portion 72. The lower portion 72 of the vertical elongate member 68 is fixed to an upper hinge member 74. The tyre stillage 66 further includes a lower elongate member 76 having an upper end 78 and a lower end 80. The upper end 78 of each lower elongate member 76 is hingedly coupled to the upper hinge member 74. The lower end 80 of said lower elongate member 76 is provided with a lower hinge member 82 configured to translatably engage the front and rear rails 46a, 46b.

In the embodiments shown in the Figures, the lower elongate member 76 comprises a pair of parallel lower elongate members 76a, 76b. Respective upper ends 78 of the lower elongate members 76a, 76b are hingedly coupled to the upper hinge member 74 and respective lower ends 80 of the lower elongate members 76a, 76b are hingedly coupled to the lower hinge member 82. The upper and lower hinge members 74, 82 allow the lower elongate members 76 of the tyre stillage 66 to be independently positioned at different angles with respect to the vertical elongate member 68 so that the spacing between the transverse rails 46a, 46b may be adjusted to allow for the lower circumferential surface of one or more tyres of different diameters to be supported thereon. It will be appreciated that an effective height of the tyre stillage 66 may be decreased when the lower elongate members 76a, 76b and the transverse rails 46a, 46b are spaced further apart relative to the effective height of the tyre stillage 66 when the lower elongate members 76a, 76b and transverse rails 46a, 46b are spaced closer together.

In the embodiments shown in the Figures, the upper hinge member 74 is generally an inverted trapezoid having an upper base 84 which is longer than a lower base 86. The respective upper ends 78 of the lower elongate members 76a, 76b are hingedly coupled to respective apices of the upper and lower bases 84, 86. It will be appreciated that in other embodiments, the upper hinge member 74 may be generally rectangular, bar-shaped or have an alternative shape suitable to provide respective points from which to hingedly connect the upper end 78 of the lower elongate member 76.

The lower hinge members 82 are generally kite-shaped or triangular. The respective lower ends 80 of the lower elongate members 76a, 76b are hingedly coupled to respective apices of the lower hinge members 82. It will be appreciated that in alternative embodiments, the lower hinge members 82 may have an alternative shape suitable to provide respective points from which to hingedly connect the lower end 80 of the lower elongate member 76.

The lower hinge member 82 may be fixed to or integrally formed with an L-shaped plate 88 which is configured to respectively engage the front or rear rails 46a, 46b. The L-shaped plates 88 may be slidably positioned along the front and rear rails 46a, 46b and releasably fastened to a desired position therealong by means of suitable fixing means.

The L-shaped plates 88 may be provided with one or more boltholes to receive a locking bolt to secure the L-shaped plates 88 to the front or rear rail 46a, 46b. In use, the one or more boltholes of the L-shaped plates 88 are correspondingly aligned with the one or more apertures disposed in the front or rear rails 46a, 46b to receive locking bolts therein to secure the L-shaped plates 88 to the front or rear rail 46a, 46b at the desired position.

The L-shaped plates 88 may be further provided with respective second roller assemblies 90, as shown in more detail in FIGS. 2a to 2c. The second roller assemblies 90 may be configured to engage with and travel along the front and rear transverse rails 46a, 46b and be releasably fastened to a desired position therealong by means of a suitable fixing means. In this particular embodiment, front and rear transverse rails 46a, 46b are respectively configured with a second C-section profile 92 to facilitate travel of the second roller assemblies 90 along their length. The front and rear transverse rails 46a, 46b are provided with respective stop plates 94 beyond each end of the front and rear transverse rails 46a, 46b.

Each second roller assembly 90 includes a longitudinal mounting plate 96 fixed to the L-shaped plate 88, a pair of second rollers 98 configured to travel within the second C-section profile 92 of the front and rear rails 46a, 46b and a pair of roller shaft assemblies 100 mounted on the longitudinal mounting plate 96 and configured to drive the pair of second rollers 98.

The pair of second rollers 98 may be 'locked' in a friction fit in a desired position within the second C-section profile 92 along the front and rear transverse rails 46a, 46b by means of a second rocker assembly 102 actuated by a second lever 104, preferably an second over-centre lever, positionable between a locked position and an unlocked position. In a locked position, the second roller 98 is raised upwardly to abut an upper surface of the second C-section profile 92 of the front and rear rails 46a, 46b. To ensure that the second rollers 98 remain locked in the desired position along the second C-section profile 92, bolts may be threaded through aligned boltholes in the L-shaped plate 88 and correspondingly aligned apertures in the second C-section profile 92. In an unlocked position, the second rollers 98 engage a lower surface of the second C-section profile 92 of the front and rear transverse rails 46a, 46b allowing them to roll along the second C-section profile 92 and translate the tyre stillage 66 to the desired position along the front and rear transverse rails 46a, 46b.

The second rocker assembly 102 includes a rocker 106 mounted to the longitudinal mounting plate 96 via a rocker mounting plate 108, and a lever assembly 110 operatively associated with the second over-centre lever 104. The rocker 106 is operatively connected to the lever assembly 110 via a lever-rocker connecting rod 112. Each roller shaft assembly 100 has a bushing 114 eccentrically mounted for rotatable movement thereon. The bushing 114 of one of the roller shaft assemblies 100 is operatively connected to the lever assembly 110 via a connecting rod 116. The bushing 114 of the other of the roller shaft assemblies 100 is connected to the rocker 106 via a roller-rocker push rod 118. A respective effective length of the lever-rocker connecting rod 112 and connecting rod 116, and the roller-rocker push rod 118 may be independently adjustable by means of a threading coupling on each end thereof.

In another embodiment, the front and rear transverse rails 46a, 46b may be provided with a respective pair of chocks 120 to support the upstanding tyre against the tyre stillage 66. The chocks 120 are wedge-shaped. In use, the chocks 120 are positioned to engage an edge of the circumferential surface of the upstanding tyre proximal the tyre wall to laterally stabilise the upstanding tyre against the tyre stillage 66.

The chocks 120 may be fixed at a desired position along the front and rear transverse rails 46a, 46b. In some particular embodiments, the chocks 120 may be slidable to the desired position along the front and rear transverse rails 46a, 46b and releasably fixed thereto.

In a further embodiment, the chocks 120 may also be used to support the upstanding tyre against the rigid tyre stillage 122 on the tyre support frame 34. In this particular embodiment, the chocks 120 may be fixed at a desired position along the front and rear transverse rails 36, 38. Additionally, the chocks 120 may be slidable to the desired position along the front and rear transverse rails 36, 38 of the tyre support frame 34 and releasably fixed thereto.

The tyre support frame 34 at the front end 16 of the trailer 10, 10', 10" may be provided with a rigid tyre stillage 122.

The rigid tyre stillage 122 includes a vertical elongate member 124 having an upper portion 126 and a lower portion 128, and a base member 130 for supporting the vertical elongate member 124. The vertical elongate member 124 is disposed equidistantly between front and rear transverse rails 36, 38. In these particular embodiments, the base member 130 is mounted on the longitudinal cross-member 42 in vertical alignment therewith. In these embodiments, the longitudinal cross-member 42 may be an integral extension of the goose-neck portion 18.

The base member 130 comprises an A-frame 132 having front and rear inclined struts 134 disposed between front and rear transverse rails 36, 38 of the tyre support frame 34, and a horizontal cross-member 136 interconnecting the front and rear inclined struts 134 and the lower portion 128 of the vertical elongate member 124.

The tyre stillage 66 and the rigid tyre stillage 122 each include a pair of restrainers 138. The restrainers 138 are disposed at the upper portions 70, 126 of the vertical elongate members 68, 124. The restrainers 138 are configured, in use, to respectively engage and restrain lateral movement of an upstanding tyre from opposing sides of either the tyre stillages 66, 122.

In the embodiments shown in the figures, the restrainers 138 includes a respective sleeve member 140 for engaging the vertical elongate members 68, 124 of the tyre stillages 66, 122.

The sleeve member 140 may be a hollow tubular section. Suitable cross sectional shapes of hollow tubular sections include rectangular, square, and circular although other cross-section shapes such as elliptical, hexagonal or L-shaped are available. The sleeve member 140 is shaped to correspond with a cross-section of the vertical elongate members 68, 124 of the tyre stillages 66, 122 and may be sized to be marginally greater than the cross-sectional size of the vertical elongate members 68, 124 thereby allowing the sleeve member 140 to slidably engage the vertical elongate members 68, 124 so as to adjust the effective height of the restrainer 138 to allow engagement of upstanding tyres on either side of the tyre stillages 66, 122 of different sizes and diameters.

In the embodiment shown in FIGS. 3 to 6, respective sleeve members 140a, 140b of the pair of restrainers 138 slidably engage the elongate members 68, 124 independently of one another. The upper portions 70, 126 of the tyre stillages 66, 122 may be provided with a respective pulley assembly 142 for raising and lowering the sleeve members 140a, 140b to a desired position with respect to the vertical elongate members 68, 124.

The pulley assembly 142 includes a winch or ratchet (not shown) disposed on the lower portions 72, 128 of the pair of lower elongate members 76 of the tyre stillage 66. Alternatively, the winch or ratchet may be disposed on the inclined struts 134 of the base member 130 of the rigid tyre stillage 122. The pulley assembly 142 further comprises one or more sheaves 144 disposed on the upper portions 70, 126 of the tyre stillages 66, 122, an eyelet 146 disposed on the respective sleeve member 140a, 140b, and a flexible elongate member (not shown), such as a wire or cord, connected at respective opposing ends to the winch or ratchet and the eyelet 146 and threaded around the one or more sheaves 144. In use, sleeve members 140a, 140b may be raised independently of one another to a desired position with respect to the vertical elongate members 68, 124 by operating the winch or ratchet of the respective pulley assembly 142.

The restrainer 138 includes a bracket member 148 laterally extending from the sleeve member 140 and a hook member 150 extending from the bracket member 148 for engaging the upstanding tyre.

The bracket member 148 is generally L-shaped and comprises a face plate 152 mounted on the sleeve member 140 and a first laterally extending part 154. The first laterally extending part 154 may comprise a sleeve 156 to receive the hook member 150 therein. The sleeve 156 may be provided with one or more apertures disposed at intervals along the length of the sleeve 156 to receive locking pins to secure the hook member 150 therein and to adjust the effective distance of the hook member 150 from the sleeve member 140.

The hook member 150 is generally L-shaped and comprises a second laterally extending part 158, an upwardly extending part 160 and a hook 162 mounted on an end 164 of the upwardly extending part 160. The hook 162 is generally inverted-U-shaped and is disposed in opposing parallel alignment with the face plate 152. In use, the hook 162 is positioned in an internal void in the upstanding tyre defined by the circumferential surface and opposing side walls of an upper portion of the upstanding tyre, thereby restraining the upstanding tyre from lateral movement relative to the tyre stillages 66, 122.

The second laterally extending part 158 of the hook member 150 may be provided with one or more apertures disposed at intervals along the length of the second laterally extending part 158. In use, the one or more apertures of the second laterally extending part 158 of the hook member 150 are correspondingly aligned with the one or more apertures disposed in the sleeve 156 to receive locking pins therein to secure the hook member 150 in the sleeve 156 of the bracket member 148 and to adjust the effective distance of the hook 162 from the sleeve member 140.

In the embodiments shown in the figures, the first laterally extending part 154 comprises a pair of sleeves 156a, 156b disposed in vertical parallel alignment with one another. In this particular embodiment, two hook members 150 may be received in the sleeves 156a, 156b to restrain two adjacent upstanding tyres. It will be appreciated that the second laterally extending part 158 of a first of the hook members 150 may be longer than the second laterally extending part 158 of a second of the hook members 150 to enable the hook 162 of the first hook member 150 to reach and restrain the upstanding tyre which is furthest from the tyre stillages 66, 122.

In an alternative embodiment (not shown), the second laterally extending part 158 of the hook member 150 and the first laterally extending part 154 of the bracket member 148 may be integrally formed with one another.

With reference to FIGS. 10, 11a, 11b, 12a and 12c, an alternative embodiment of the trailer 10' is shown.

In this particular embodiment, the trailer 10' largely includes the features of trailer 10 but is shorter in length than trailer 10. Accordingly, the elongate chassis rails 20 proximal to the front end 16 do not have increased depth or any lightening apertures 26. Additionally, the rear end 14 is not provided with the turntable 30 to allow an underside of an adjacent trailer 10 to couple therewith.

With reference to FIGS. 13, 14a, 14b, 15a and 15b, a further embodiment of the trailer 10" is shown.

In this particular embodiment, the trailer 10" largely includes the features of trailers 10 and 10' but is shorter in length than trailers 10, 10'. Accordingly, the elongate chassis rails 20 proximal to the front end 16 do not have increased depth or any lightening apertures 26. Additionally, trailer 10" does not include the tyre support frame 34 at the front end 16. Rather, the front end 16 of trailer 10" is provided with a tow frame or goose neck 166 extending forwardly from the goose neck portion 18. Consequently, trailer 10" may be configured to support up to four oversize tyres in an upstanding position.

In use, an arrangement of a plurality of tyres of various dimensions and widths is configured to balance the load on the trailer 10, 10', 10".

Prior to loading the tyres on the trailer 10, 10', 10", the transverse rails 46a, 46b are positioned along the length of the elongate chassis rails 20 to accommodate the desired number of upstanding tyres to be hauled and to balance the load on the trailer 10, 10', 10". In use, the wear plate 52 provided on the first roller assembly 48 of the transverse rails 46a, 46b are slidably translated along the elongate chassis rails 20 by actuating the over-centre lever 62 of the first roller assembly 48 into the unlocked position, thereby engaging the first roller 56 with the lower surface of the first C-section profile 50 of the elongate chassis rails 20 to allow them to roll therealong to the desired position. The over-centre lever 62 may then be moved into the locked position, whereby the first roller 56 is raised upwardly to abut the upper surface of the first C-section profile 50 of the elongate chassis rails 20 in a friction fit 'locked' position. The wear plate 52 is also further secured to the elongate chassis rails 20 by means of fixing pins or bolts. At the desired position along the elongate chassis rails 20, the transverse rails 46a, 46b support one or more tyres in an upstanding position thereon.

The tyre stillages 66 are then slidably translated to an appropriate position across the length of the transverse rails 46a, 46b to accommodate one or more upstanding tyres of a desired width. In use, the L-shaped plates 88 provided at the lower hinge members 82 of the lower elongate members 76 are slidably translated along the front and rear rails 46a, 46b by actuating the over-centre lever 104 of the second roller assembly 90 into the unlocked position, thereby engaging the second rollers 98 with the lower surface of the second C-section profile 92 of the front and rear transverse rails 46a, 46b to allow them to roll therealong to the desired position. The over-centre lever 104 may then be moved into the locked position, whereby the second rollers 98 are raised upwardly to abut the upper surface of the second C-section profile 92 of the front and rear transverse rails 46a, 46b in a friction fit 'locked' position. The L-shaped plate 88 is further secured to transverse rail 46a, 46b by means of fixing pins or bolts.

Subsequently, the chocks 120 are positioned by sliding them along their respective rails 46a, 46b to a position in which the chocks 120 will be wedged against an edge of the circumferential surface of the upstanding tyre when it is loaded onto the transverse rails 46a, 46b so as to urge the tyre in close facing arrangement with the vertical elongate member 68 of the tyre stillage 66.

The sleeve member 140 of the restrainer 138 is raised or lowered with respect to the vertical elongate members 68, 124 by operation of the pulley assembly 142 and positioned such that the bracket member 148 and hook member 150 extend toward the elongate chassis rails 20 of the frame 12 at an appropriate effective height to position the hook member 150 in the inner void of the tyre. The second laterally extending part 158 of the hook member 150 may then be positioned in either of sleeves 156a or 156b of bracket member 148. The effective distance between the hook 162 and the face plate 152 of the bracket member 148 may be adjusted to a pre-determined distance by positioning and locking the second laterally extending part 158 of the hook member 150 by means of inserting locking pins through corresponding apertures in the second laterally extending part 158 and one of sleeves 156a, 156b. Preferably, the effective distance between the hook 162 and the face plate 152 of the bracket member 148 is selected such that a side wall of the tyre would abut the face plate 152 of the bracket member 148 when the hook 162 is positioned within the inner void of the tyre.

Oversize tyres can subsequently be loaded onto the trailer 10, 10', 10" from adjacent elongate chassis rails 20 by means of a fork-lift truck or similar vehicle. The tyre is then placed on its circumferential surface resting on the transverse rails 46a, 46b with tyre side walls in parallel alignment with the elongate chassis rails 20 of the frame 12. The chocks 120 urge the upstanding tyre against the vertical elongate member 68 of the tyre stillage 66, and the restrainer 138 restrains the tyre from lateral movement with respect to the tyre stillage 66.

Embodiments of the trailers 10, 10', 10" may be fabricated from metal such as aluminium or steel, or alloys thereof, and may comprise polymeric components such as injection moulded plastic materials.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A trailer for hauling tyres, the trailer comprising:
a frame having a front end, a rear end, and a pair of parallel elongate chassis rails one or more pairs of transverse rails longitudinally translatable with respect to said elongate chassis rails between the front and rear ends, each pair of transverse rails being adapted to support one or more tyres in an upstanding position thereon;
and a tyre stillage associated with each pair of transverse rails for supporting one or more upstanding tyres thereagainst, wherein the tyre stillage comprises a vertical elongate member hingedly attached to two lower elongate members which allow each transverse rail in the one or more pairs to be independently translatable with respect to said elongate chassis rail.

2. The trailer according to claim 1, wherein the transverse rails are provided with a first roller assembly configured to engage the elongate chassis rail.

3. The trailer according to claim 2, wherein the first roller assembly is configured to releasably fasten the transverse rails to the elongate chassis rails at a desired position.

4. The trailer according to claim 1, wherein the vertical elongate member has an upper portion and a lower portion, an upper hinge member coupled to the lower portion of the vertical elongate member, and a respective upper end of each lower elongate member is hingedly coupled to the upper hinge member and a lower end of each lower elongate member is provided with a lower hinge member to allow each transverse rail to be independently translatable with respect to said elongate chassis rails.

5. The trailer according to claim 1, wherein the tyre stillage is transversely translatable with respect to the transverse rails.

6. The trailer according to claim 5, wherein the respective lower end of each lower elongate member is configured to be translatable with respect to the transverse rails.

7. The trailer according to claim 6, wherein the lower hinge member is provided with a second roller assembly configured to engage the transverse rails and allow the stillage to be translatable with respect to said transverse rails.

8. The trailer according to claim 7, wherein the second roller assemblies are configured to releasably fasten the tyre stillage to the transverse rail at a desired position.

9. The trailer according to claim 1, wherein the lower elongate member comprises a pair of parallel elongate members.

10. The trailer according to claim 1, wherein each transverse rail is provided with at least one chock to support the upstanding tyre against the tyre stillage.

11. The trailer according to claim 10, wherein the chock is slidable to a desired position along the transverse rail.

12. The trailer according to claim 11, wherein the chock is configured to be fastened at the desired position along the transverse rail to support the upstanding tyre.

13. The trailer according to claim 1, wherein the frame comprises a plurality of transverse cross-members interconnecting the parallel elongate chassis rails.

14. The trailer according to claim 1, wherein the front end of the frame is elevated with respect to the rear end of the frame to facilitate coupling of the frame to a tractor unit.

15. The trailer according to claim 1, wherein a tyre support frame extends from the front end of the frame.

16. The trailer according to claim 15, wherein the tyre support frame comprises a front transverse rail and a rear transverse rail spaced apart at a distance to support the lower circumferential surface of one or more tyres in the upstanding position thereon, and a pair of side rims interconnecting the front and rear transverse rails.

17. The trailer according to claim 16, wherein the tyre support frame further comprises a rigid tyre stillage mounted on and between the pair of transverse rails for supporting one or more upstanding tyres thereagainst.

18. The trailer according to claim 17, wherein the rigid tyre stillage comprises a vertical elongate member supported by a base member, wherein the base member is disposed in spaced parallel alignment between the side rims interconnecting the front and rear transverse rails.

19. The trailer according to claim 1, wherein said tyre stillage comprises a restrainer configured to engage the one or more upstanding tyres and restrain lateral movement of the one or more upstanding tyres relative to said tyre stillage.

20. The trailer according to claim 19, wherein the restrainer comprises a sleeve member for engaging said tyre stillage, a bracket member transversely extending from the sleeve member, and a hook member extending from the bracket member for engaging the upstanding tyre.

21. The trailer according to claim 20, wherein the restrainer further comprises a pulley assembly to raise or lower the sleeve member of the restrainer to a desired position with respect to said tyre stillage.

22. A long combination vehicle for hauling tyres comprising two or more trailers coupled in longitudinal alignment with one another and a tractor unit, the trailer comprising:
a frame having a front end, a rear end, and a pair of parallel elongate chassis rails one or more pairs of transverse rails longitudinally translatable with respect to said elongate chassis rails between the front and rear ends, each pair of transverse rails being adapted to support one or more tyres in an upstanding position thereon;
and a tyre stillage associated with each pair of transverse rails for supporting one or more upstanding tyres thereagainst, wherein the tyre stillage comprises a vertical elongate member hingedly attached to two lower elongate members which allow each transverse rail in the one or more pairs to be independently translatable with respect to said elongate chassis rail.

* * * * *